April 7, 1936.                A. H. CARTER                2,036,459
ADJUSTABLE AUTO HOOD PAINT RACK
Filed Jan. 26, 1934
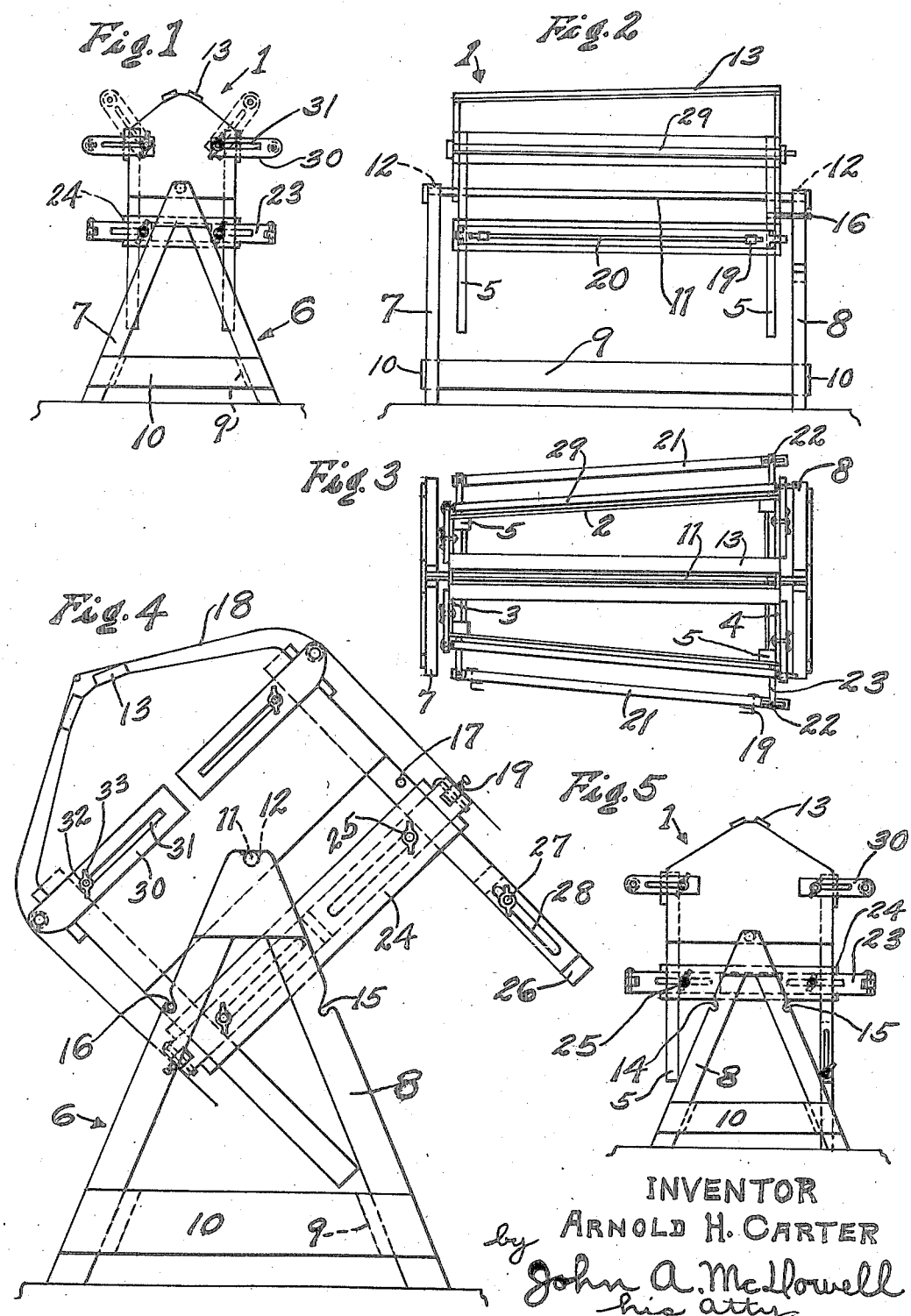
INVENTOR
ARNOLD H. CARTER
by John A. McDowell
his atty.

Patented Apr. 7, 1936

2,036,459

UNITED STATES PATENT OFFICE 2,036,459

ADJUSTABLE AUTO HOOD PAINT RACK

Arnold H. Carter, Wilmington, Calif., assignor of one-fourth to Hubert H. Klug, Wilmington, Calif.

Application January 26, 1934, Serial No. 708,403

3 Claims. (Cl. 91—60)

This invention relates more particularly to a device to permit the auto painter to paint the hoods of motor vehicles easily.

An object of this invention is to place the hood of an automobile on an adjustable rack whereby he can turn said hood at any angle.

Another object of the invention is that the device may be adjusted to allow any size of auto hood to fit upon it.

Simplicity and cost of manufacture are also objects of the invention.

A feature of the invention is that the auto hood may be placed on the device at the height convenient to the painter so that he neither has to stoop or reach.

The invention is not limited to the specific construction shown, and it is understood that forms of embodiment other than those shown may be employed without departing from the invention or from the principles herein disclosed and embodied in the mechanism herein set forth and claimed.

Other objects, advantages and features of invention may appear from the accompanying drawing, the subjoined detailed description and the appended claims.

The accompanying drawing illustrates the invention.

Figure 1 is a front elevation of the invention showing the adjustable parts in extended position. Broken lines indicate another position of the top members.

Fig. 2 is a side elevation of Fig. 1.

Fig. 3 is a plan view of the invention showing the top members in closed position and the lower members in extended position to show the adjustable construction thereof.

Fig. 4 is an enlarged rear elevational view showing the hood diagrammatically mounted thereon and the rack tilted at an angle.

Fig. 5 is a rear elevational view of Fig. 2 on the same scale as Fig. 1 showing the adjustable parts in the extended position.

The invention comprises a frame 1 having sides 2, a front member 3 and rear member 4 reinforced by posts 5.

A support 6 comprising a triangular front end 7 and rear end 8 being connected together by side members 9 and end members 10 at the bottom thereof.

The frame 1 is provided with a horizontal shaft 11 having its ends resting in slots 12 at the top of the triangular ends.

13 indicates ties that reinforce the frame members 3 and 4 at their top.

The triangular rear end 8 is provided with slots 14 and 15 in each side near the top to permit bars 16 and 17 to fit into that hold the frame 1 tilted when desired as shown in Fig. 4 of the drawing.

A hood 18 is shown mounted on and fixed to the frame 1 by clamps 19 that are adjustably mounted in slots 20 of the adjustable side bars 21 that are jointed at 22 to the horizontal bars 23 that are slidably mounted in the bearings 24 of the frame 1 and are held fixed in position by the winged nuts 25.

To hold the frame 1 in vertical position an adjustable foot 26 is provided that is mounted to one of the rear posts as shown in Figs. 4 and 5 and which is held in place by the bolt 27 that rides in the slot 28 and may be adjusted by the operator as desired.

Adjustably mounted to the top of the frame 1 are the rollers 29 that are supported by the arms 30 that are so constructed to permit the operator to place them at different angles to allow the hood of a vehicle to rest thereon.

Said arms being provided with slots 31 that permit bolts 32 therein and which are held in the frame top 1 permit the arms to slide thereon and are held in the position desired by the winged nuts 33 on the bolts 32.

In operation the hood is first placed on the rack and then the arms 30 and rollers 29 are adjusted to whatever angle desired by the painter and then the rack may be tilted to different angles by placing the bars 16 and 17 into either of the slots 14 and 15.

The frame may be lifted from the rack either before the hood is painted or after being painted and allowed to stand on its posts 5 until the hood dries as desired by the painter.

I claim:

1. The combination in an adjustable auto hood paint rack of a frame having a horizontal shaft; said frame comprising side and end members and corner posts; said end members comprising a front end of smaller width than the rear end and the rear end extending higher than the front end; adjustable side bars that are jointed to horizontal bars that are slidably mounted in bearings of the frame and held fixed in position by winged nuts; rollers adjustably mounted to the top of said frame supported by arms constructed to permit the operator to place said rollers at different angles to allow the hood of a vehicle to rest thereon; a support provided with slots at its top end into which is mounted said shaft and means comprising clamps that are adjustably mounted in slots of said adjustable side bars to hold an auto hood in place on said frame.

2. The combination in an adjustable auto hood rack comprising a frame having corner posts and a support for the frame; adjustable side bars that are jointed to horizontal bars slidably mounted in bearings of the frame and held fixed in position by winged nuts; rollers adjustably mounted to the top of said frame supported by arms constructed to permit an operator to place said rollers at different angles to allow the hood of a vehicle to rest thereon; said support comprising a triangular front and rear end being connected together by side and end members at the bottom thereof; said triangular ends provided with slots in their top and said rear end having a slot in each side near the top thereof; a horizontal shaft fixed to said frame and having its ends mounted in said slots in the top of said support ends and means comprising a foot adjustably mounted to one of said posts to hold said frame in vertical position.

3. The combination of an adjustable auto hood rack comprising a frame and a support for the frame; adjustable side bars that are jointed to horizontal bars slidably mounted in bearings of the frame and held fixed in position by winged nuts; rollers adjustably mounted to the top of said frame supported by arms constructed to permit an operator to place said rollers at different angles to allow the hood of a vehicle to rest thereon; said support comprising a triangular front and rear end being connected together by side and end members at the bottom thereof; said triangular ends provided with slots in their top and said rear end having a slot in each side near the top thereof; said frame being provided at its rear end with bars that fit into said slots in each side of the rear end of said support to hold said frame tiltable when desired.

ARNOLD H. CARTER.